United States Patent [19]

Milan

[11] 3,744,137
[45] July 10, 1973

[54] HEIGHT GAUGE
[76] Inventor: Nicholas M. Milan, 21664 New Castle, Harper Woods, Mich. 48236
[22] Filed: Apr. 28, 1971
[21] Appl. No.: 138,090

[52] U.S. Cl. .................................. 33/170, 33/166
[51] Int. Cl. .......................................... G03b 1/64
[58] Field of Search ................. 33/170, 172 R, 166, 33/169 R

[56] References Cited
UNITED STATES PATENTS
2,544,004    3/1951    Bauer ............................. 33/170
3,115,708    12/1963   Roy ............................... 33/170 UX
3,120,061    2/1964    Pfleiderer ......................... 33/166

FOREIGN PATENTS OR APPLICATIONS
875,817    8/1961    Great Britain ....................... 33/170

Primary Examiner—William D. Martin, Jr.
Attorney—Whittemore, Hulbert & Belknap

[57] ABSTRACT

The height gauge includes an upstanding tubular housing in which is mounted a screw/nut type micrometer. The screw of the micrometer is connected to the base of the housing to prevent vertical travel of the screw whereby the micrometer nut mechanism will travel vertically. The micrometer nut mechanism is connected to a tubular gauge member which is received within the housing. The tubular gauge member includes gauge pins which extend exteriorly of the housing to accomplish the measuring function of the gauge. The tubular gauge member is spaced from the major portion of the interior surface of the housing to provide thermal insulation therebetween and thereby prevent the gauging parts being subjected to ambient temperature changes resulting from handling of the gauge mechanism during use.

7 Claims, 6 Drawing Figures

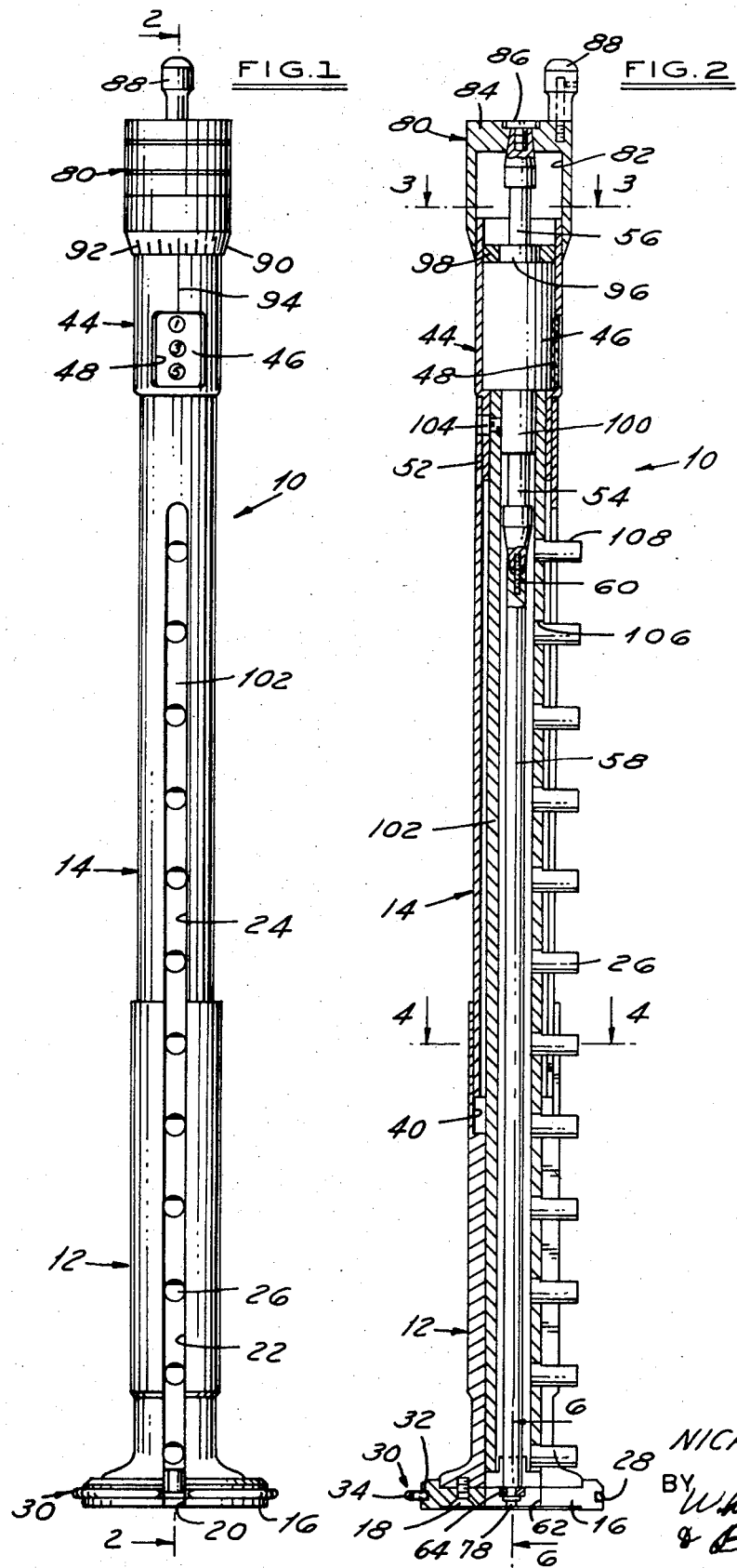

PATENTED JUL 10 1973
3,744,137
SHEET 2 OF 2
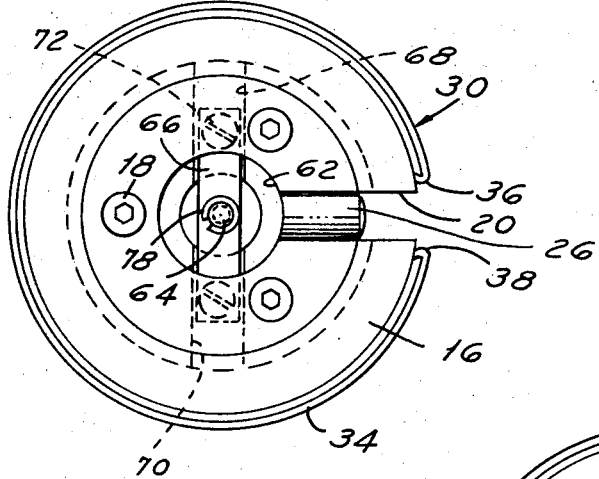
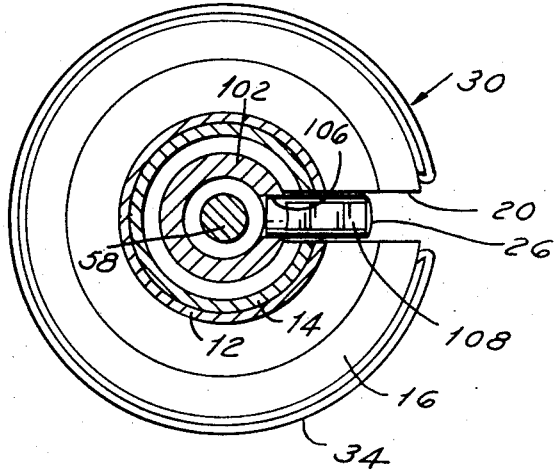
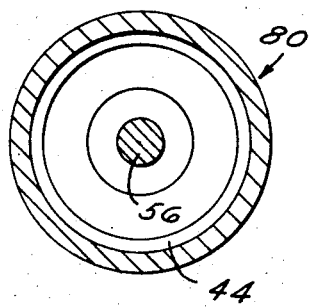
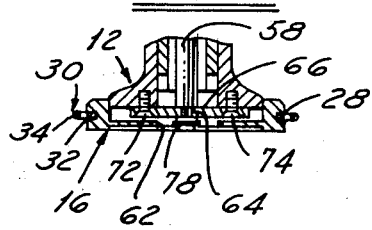
INVENTOR
NICHOLAS M. MILAN
BY Whittemore, Hulbert
& Belknap
ATTORNEYS

HEIGHT GAUGE

BACKGROUND OF THE INVENTION

Gauges similar to the present gauge are disclosed in my previous U.S. Pat. Nos. 3,106,022 and 3,510,952. The present gauge possesses certain advantages over my prior designs. One feature of the present gauge is that the gauging parts are located within a housing but are thermally insulated from direct contact with the major portion of the housing whereby when the gauge is handled, temperature differentials caused by the difference in ambient temperature and the temperature of the user's hands or breath will not be impinged upon the gauging parts to cause expansion thereof with resultant inaccuracies in measurements.

The present gauge also includes a simplified structure which may be inexpensively manufactured but which results in an accurate gauge. One feature of the construction is formation of a gauging assembly including an elongated tubular gauge member having gauge pins extending therefrom. This device is assembled by press fitting the pins into the tubular member and then machining flats on the pins for measuring purposes. It is not required to subsequently heat-treat the assembly because the pins are preheated before press fitting onto the tubular member. The resultant structure is relatively inexpensive as compared to prior art structures of the same general description.

SUMMARY OF THE INVENTION

The height gauge comprises an upstanding tubular housing which has a longitudinally extending slot in the sidewall thereof. A screw/nut type micrometer is mounted in the upper end of the housing. A portion of the micrometer screw extends downwardly from the micrometer body. The housing includes a base. An elongated tie member is provided in the housing extending between the downwardly extending screw portion and the base. The elongated tie member is fixedly secured at one end to the screw portion to rotate therewith and rotatably secured at the other end to the base to rotate with respect thereto whereby the micrometer screw is fixed against vertical travel with the result that the micrometer nut mechanism travels vertically upon rotation of the screw. Means are provided in the housing to rotate the micrometer screw. An elongated tubular gauge member is provided within the housing. The gauge member extends over the elongated tie member. The major portion of the elongated tubular gauge member is spaced from the housing inner wall surfaces to provide thermal insulation therebetween. A plurality of vertically spaced apart gauge pins extend from the elongated tubular member through the slot in the housing. The gauge pins are for use in connection with measuring the height of a subject device. A portion of the micrometer nut mechanism extends downwardly from the micrometer body. The upper end of the elongated tubular guide member is connected to the downwardly extending portion of the micrometer nut mechanism for movement therewith. Movement of the nut mechanism and associated elongated tubular guide member results in movement of the gauge pins for contact of one of the pins with a subject device. Indicia is provided on the height gauge to indicate the height of any one of the height pins.

IN THE DRAWINGS

FIG. 1 is a front elevational view of one embodiment of the height gauge of the present invention;

FIG. 2 is a sectional view of the height gauge taken substantially along the line 2—2 of FIG. 1 looking in the direction of the arrows;

FIG. 3 is a sectional view of the height gauge taken substantially along the line 3—3 of FIG. 2 looking in the direction of the arrows;

FIG. 4 is a sectional view of the height gauge taken substantially along the line 4—4 of FIG. 2 looking in the direction of the arrows;

FIG. 5 is a view of the bottom of the height gauge; and

FIG. 6 is a sectional view of the height gauge taken substantially along the line 6—6 of FIG. 2 looking in the direction of the arrows.

The height gauge 10 includes a base 12 to which is attached an upstanding tubular cover element 14. The base or lower housing portion 12, cover element or intermediate housing portion 14 and tubular element or upper housing portion 44, hereinafter described, form an upstanding tubular housing. The base 12 includes a detachable base plate 16. The base plate 16 is secured to the bottom of the base 12 by means of screws 18, it being noted that the base plate has a recess for the reception of the lower end of the base. A radial slot 20 is provided in the base plate 16. The slot 20 is in alignment with longitudinally extending slots 22, 24 provided, respectively, in the base 12 and cover element 14 of the housing. These slots permit a plurality of pin elements 26 to extend exteriorly of the gauge and to be moved vertically during manipulation of the gauge for making height measurements.

An annular groove 28 is provided on the outer periphery of the base plate 16. The groove 28 receives a spring 30. 30, The spring member 30 has an inner portion 32 which is received in the groove 28 and an outer portion 34 which extends radially outwardly from the base plate. The portion 34 may make contact with the surface upon which the gauge is supported to prevent tipping over of the gauge. The inner and outer portions 32, 34 are joined together by turned back portions 36, 38 to define a space which is aligned with slot 20 so as to avoid obstruction of the lowermost pin element 26 upon downward movement of the pin elements.

The lower end of the tubular cover element 14 is received in a recess 40 provided in the upper end of the base 12. As will be noted, there is a space between the lower end of the element 14 and the bottom of the recess 40. This space permits movement of the lower portion of the cover element 14 which will occur upon temperature change causing contraction or expansion thereof. The cover element 14 may be fabricated of aluminum while the remaining portions of the gauge may be fabricated of steel.

A tubular element 44, which also forms part of the housing along with the cover element 14 and base 12, is secured to the upper end of the cover element 14. The tubular element 44 encloses a screw/nut type micrometer 46. The micrometer 46 preferably has a digital readout so that measurements may be read directly in numbers. As will be noted in FIG. 1, an opening 48 is provided in the tubular element 44 to reveal three small openings provided in the face of the micrometer 46. Numerals appear in the micrometer opening, exemplary the numerals "123" indicating a measurement of 0.123 inch. Such micrometers are conventional and are available in the market place, one suitable unit being marketed under the trademark Speed Mike by the Slocum Manufacturing Company.

The tubular element 44 has an enlarged upper portion to receive the body of the micrometer. The lower portion 52 is of reduced diameter and is received in the upper end of the cover element 14 in press fitting relationship to firmly secure these parts together.

The micrometer 46 includes a screw element having unthreaded portions 54, 56 which extend externally of the micrometer body upwardly and downwardly therefrom. The threaded portion of the screw is located interiorly of the body and engages the usual nut which is free to travel vertically.

The lower portion 54 is fixedly secured to the upper end of a rod 58 by means of threaded fastener 60. The lower end of the rod 58 extends downwardly through the gauge and terminates in a central opening 62 provided in the base plate 16. As will be noted in FIGS. 2, 5 and 6, the lower end 64 of the rod 58 is of reduced diameter and extends through an opening provided in an elongated bracket 66 to terminate in the space defined by the opening 62. The ends of the bracket 66 are received in slot portions 68, 70 provided in the upper surface of the base plate and are secured to the base by means of a pair of screws 72, 74.

Fastening structure 78 is secured to the lower end 64 of the rod 58. The fastening structure 78 includes a first spring washer, a flat washer and a snap ring which is received in an annular groove provided in the end portion 64. This arrangement securely fastens the rod to the base but permits rotation of the rod upon turning of the micrometer screw. The spring washer provides a constant pressure against the bracket 66 while permitting freedom of rotation, the pressure functioning to minimize backlash of the micrometer screw thus insuring accurate micrometer readings. The lower end of the rod 58 is preferably flame-hardened to resist wear.

A rotatable cap member 80 is received on the upper end of the tubular element 44. The cap member 80 has an interior recess 82 into which the upper screw portion 56 projects. The end of the screw portion 56 is tapered for reception into a tapered opening in the end wall 84 of the cap member 80. A screw 86 engages a threaded opening in the upper end of the screw portion 56 to secure the parts together. It will be noted that the lower end of the other screw portion 54 is also tapered for reception into a tapered opening in the upper end of rod 58. These tapers permit wedging engagement of the parts to insure secure fastening thereof and prevent slippage upon turning of the micrometer screw. A knob 88 is fastened to the cap member 80 to facilitate manual turning thereof with resultant turning of the micrometer screw and rod 58. With the arrangement shown, the micrometer screw is stabilized in the vertical direction so that it will not move up and down. However, it is freely rotatable to permit manipulation of the micrometer.

As will be noted in FIG. 1, the lower portion 90 of the cap member 80 is tapered inwardly. Indicia 92 are provided on the surface of portion 90. An indicator line 94 is provided on the outer surface of tubular element 44. Indicia 92 and line 94 permit reading of the gauge to the nearest ten-thousandths, the indicia 92 having a zero point with the ten-thousandths being read therefrom upon turning of the cap member 80 in the clockwise or counter-clockwise direction.

The micrometer 46 has an upper cylindrical collar 96 which is received in a central opening provided in a bushing 98 which has an exterior diameter equal to the interior diameter of the upper section of tubular element 44. The concentricity of the parts results in centering of the micrometer.

A tubular portion 100 extends from the lower portion of the micrometer body. The tubular portion 100 is internally connected to the nut which engages the micrometer screw, the nut travelling up and down in response to rotation of the screw. The tubular portion 100 thus travels up and down with the micrometer nut.

A tubular gauge member 102 is received within the casing defined by the base 12, cover element 14 and tubular element 44. The member 102 has an external diameter substantially equal to the internal diameters of the base 12 and tubular element 44 and forms a slip fit therewith to be guided thereby. It will be noted, however, that the central portion of the member 102 is spaced from the cover element 14. This space provides a layer of air which thermally insulates the major portion of the member 102 from the cover element 14.

The member 102 is secured to the tubular portion 100 for travel therewith. As will be noted in FIG. 2, a screw 104 connects these parts together. Registering clearance openings are provided in the cover element 14 and tubular element 44 for insertion of the screw 104. It will also be noted that the rod 58 is of smaller diameter than the interior diameter of the member 102 to thereby be spaced from the interior wall surfaces of the member 102.

The thermal insulation of the member 102 with respect to the outer covering protects the member 102 against temperature changes, mainly increases in temperature, resulting from handling of the gauge 10 or the presence of ambient air differentials, such as would occur as a result of a person breathing on the gauge. The gauge is intended to be used in a room wherein the temperature of the room is maintained at a predetermined level. However, the gauge must be handled during use and expansion of the gauging parts caused by increases in temperature would result in inaccuracies in measurements taken. A further precaution may be taken in this respect to guard the base 12 against increases in temperature caused by handling. The base 12 may be sheathed in an insulating material such as asbestos to negate temperature increases caused by grasping thereof by a user.

The tubular gauge member 102 carries the gauge pins 26. The pins 26 are received in openings 106 which are spaced along a longitudinal line extending from top to bottom of the member 102. The opening are illustratively spaced at one inch intervals. The openings 106 are precision drilled and reamed. The material of the tubular member 102 may be, for example, relatively inexpensive cold rolled steel. The pins 26 are preferably fabricated from a tough tool steel which is hardened by heat-treating prior to assembly of the pins and tube. The tube outer diameter is precision ground and may be black chromed for increased corrosion and wear resistance. The pins 26 are initially cylindrical in shape.

After the pins have been pressed into the openings 106 to be thereby securely mounted on the tubular member 102, flats 108 are accurately ground on the pins. These flats are precisely, in the illustrated embodiment, one inch apart. The resultant assembly comprising the tubular gauge member 102 and pins 26 with flats 108 is a precision measuring instrument even though the individual pins may be somewhat out of line or the tube may not be perfectly shaped. The precision resides in the fact that the flats 108 are not formed until the assembly is completed. Grinding of the flats is an accurate process which compensates for any irregularities which may be present in the assembly prior to grinding. Inaccuracies are not introduced by heat-treating the assembly because it is not necessary to heat-treat the tubular gauge member 102 and the pins 26 are heat-treated prior to forming of the assembly.

Operation of the gauge may be readily understood. The part or unit the height of which is to be measured is placed in proximity to the gauge 10 on the same surface as the gauge 10 or a surface which is at a different but known level with respect to the surface upon which the gauge 10 is supported. A flat 108 of one of the pins 26 may directly contact a portion of the structure which is to be measured. Alternately, a feeler gauge may extend from the unit to be measured, the connection and structure of such feeler gauges being well known in the art. The flat closest to the feeler gauge or other structure to be measured is placed in alignment with such structure. The knob 88 is then turned until direct contact is made. A digital readout is then read directly from the micrometer. The indicia 92 on the cap member 80 is then read with respect to the line 94. The actual height is then computed by first counting the number of pins from the bottom of the gauge to the one which was actually used, adding, or subtracting as the case may be, to this the readout from the micrometer and adding to this the reading taken from the indicia 92. As will be appreciated, readings may be taken very closely to the support surface of the gauge 10 because the lowermost pin 26 may be dropped to the level of such support surface, permitting reading a height just slightly more than the diameter of a pin.

What I claim as my invention is:

1. A height gauge comprising an upstanding tubular housing including an upper housing portion, a lower housing portion and an intermediate housing portion located between said upper and lower housing portions, said intermediate and lower housing portions having a longitudinally extending slot in one sidewall thereof, a micrometer mounted in said upper housing portion and including a rotatable screw member and a vertically movable, non-rotatable nut member, a first portion of said screw member extending downwardly into said intermediate housing portion, an elongated tie member located in the interior of said intermediate and lower housing portions, first fastening means connecting one end of said elongated tie member to said first portion of said rotatable screw member for rotation therewith, second fastening means connecting the other end of said elongated tie member to the lower end of said lower housing portion for rotation relative thereto, an elongated tubular gauge member located within said housing which surrounds and is spaced from said elongated tie member to provide clearance therebetween, the major portion of said tubular gauge member being spaced from the inner wall surfaces of said housing to provide clearance therebetween which is occupied by air for thermally insulating said major portion of said tubular gauge member from said housing, a plurality of vertically spaced apart gauge pins extending from said tubular gauge member through said longitudinally extending slot for use in connection with measuring the height of a subject device, third fastening means connecting the upper end of said tubular gauge member to said nut member for vertical movement therewith, actuating means on said housing for rotating said screw member to result in vertical movement of said nut member and said tubular gauge member whereby said gauge pins are moved vertically for contact of one of the gauge pins with a subject device, and indicia on said housing to indicate the height of any of said gauge pins.

2. The height gauge as defined in claim 1, wherein said upper and lower housing portions include tubular bores which guidingly receive the upper and lower ends respectively of said tubular gauge member to guide said tubular gauge member during vertical movement thereof.

3. The height gauge as defined in claim 2, further characterized in the provision of a slip fit between the lower end of said intermediate housing portion and the upper end of said lower housing portion to permit thermal expansion and contraction of said intermediate housing portion.

4. The height gauge as defined in claim 1, further characterized in that said gauge pins are generally cylindrical in configuration and are fabricated from a hardened steel, one end of each gauge pin being press fitted into an opening provided in the elongated tubular gauge member, each of said gauge pins having a flat machined thereon after press fitting of the pin into the elongated tubular tubular gauge member, each of said flats being machined an accurate distance from an adjacent flat on an adjacent gauge pin.

5. The height gauge as defined in claim 1, further characterized in that said second fastening means includes a spring element for applying constant pressure between the lower housing portion and the elongated tie member to thereby minimize backlash of said micrometer.

6. The height gauge as defined in claim 1, further characterized in the provision of a radially outwardly extending spring structure on the bottom of said lower housing portion for contact with a support surface to stabilize the height gauge against being tipped over.

7. The height gauge as defined in claim 1, further characterized in that a second portion of said screw member extends upwardly from the micrometer, a rotatable cap member received on the upper end of, said upper housing portion, said rotatable cap member being fixedly secured to the upper end of said second portion of said screw member to define said actuating means on the housing to rotate said screw member.

* * * * *